United States Patent
Romero et al.

(10) Patent No.: US 8,919,739 B1
(45) Date of Patent: Dec. 30, 2014

(54) INTEGRAL VEHICLE JACK ASSEMBLY

(76) Inventors: Michael Romero, Hallandale, FL (US);
Wilnes Pierrette, Hallandale, FL (US)

( * ) Notice: Subject to any disclaimer, the term of this patent is extended or adjusted under 35 U.S.C. 154(b) by 457 days.

(21) Appl. No.: 13/456,369

(22) Filed: Apr. 26, 2012

(51) Int. Cl.
*B60S 9/02* (2006.01)

(52) U.S. Cl.
USPC ........................................... 254/423

(58) Field of Classification Search
USPC ....................... 254/423; 280/766.1
See application file for complete search history.

(56) References Cited

U.S. PATENT DOCUMENTS

| | | | |
|---|---|---|---|
| 2,449,296 A * | 9/1948 | Haight | 254/423 |
| 3,820,838 A * | 6/1974 | Limpach | 296/20 |
| D349,386 S | 8/1994 | Piebenga | |
| 5,722,641 A | 3/1998 | Martin et al. | |
| 5,765,810 A | 6/1998 | Mattera | |
| 5,931,500 A * | 8/1999 | Dagnese | 280/766.1 |
| 6,079,742 A | 6/2000 | Spence | |
| 6,527,254 B1 * | 3/2003 | Prevete | 254/423 |
| 6,752,221 B1 * | 6/2004 | Morissette | 173/38 |
| 6,910,680 B1 * | 6/2005 | Geller | 254/423 |
| 6,913,248 B1 * | 7/2005 | Schmitz | 254/423 |
| 6,991,221 B1 * | 1/2006 | Rodriguez | 254/423 |
| 7,004,457 B2 * | 2/2006 | Jackson et al. | 254/423 |
| 7,063,307 B2 * | 6/2006 | Williams, Sr. | 254/423 |

* cited by examiner

*Primary Examiner* — Lee D Wilson
*Assistant Examiner* — Henry Hong

(57) ABSTRACT

An integral vehicle jack assembly is provided for facilitating raising of the ground engaging members of a vehicle off of a supporting surface. The assembly includes a vehicle having a plurality of ground engaging members. A plurality of telescopic supports is coupled to the vehicle. Each support is movable between a deployed position and a retracted position. The deployed position is configured for raising the vehicle such that the ground engaging members are positioned in spaced relationship to a support surface. A control is operationally coupled to the supports for selectively extending and retracting the supports.

11 Claims, 4 Drawing Sheets

INTEGRAL VEHICLE JACK ASSEMBLY

BACKGROUND OF THE DISCLOSURE

Field of the Disclosure

The disclosure relates to vehicle jack devices and more particularly pertains to a new vehicle jack device for facilitating raising of the ground engaging members of a vehicle off of a supporting surface.

SUMMARY OF THE DISCLOSURE

An embodiment of the disclosure meets the needs presented above by generally comprising a vehicle having a plurality of ground engaging members. A plurality of telescopic supports is coupled to the vehicle. Each support is movable between a deployed position and a retracted position. The deployed position is configured for raising the vehicle such that the ground engaging members are positioned in spaced relationship to a support surface. A control is operationally coupled to the supports for selectively extending and retracting the supports.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
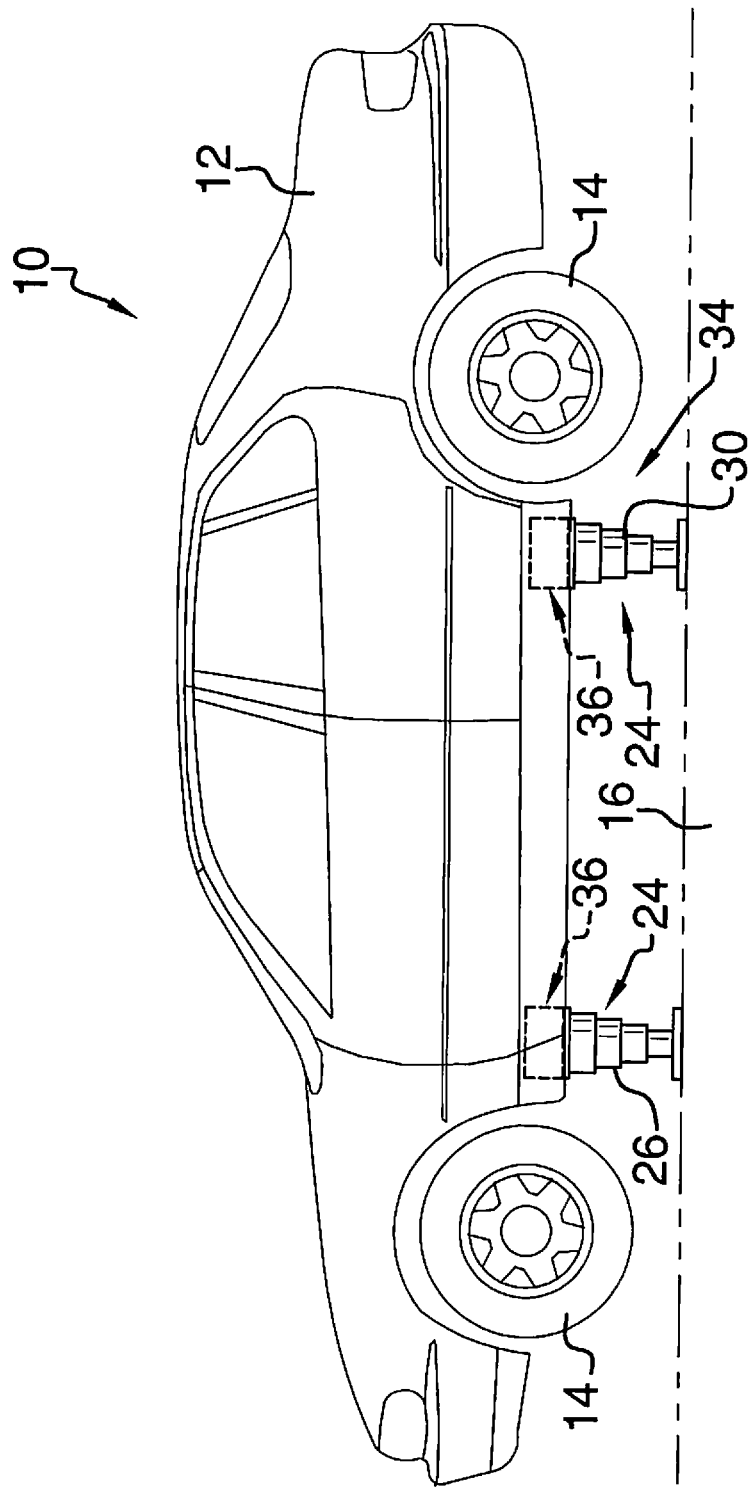
FIG. 1 is a side view of an integral vehicle jack assembly according to an embodiment of the disclosure.
Figure 2:
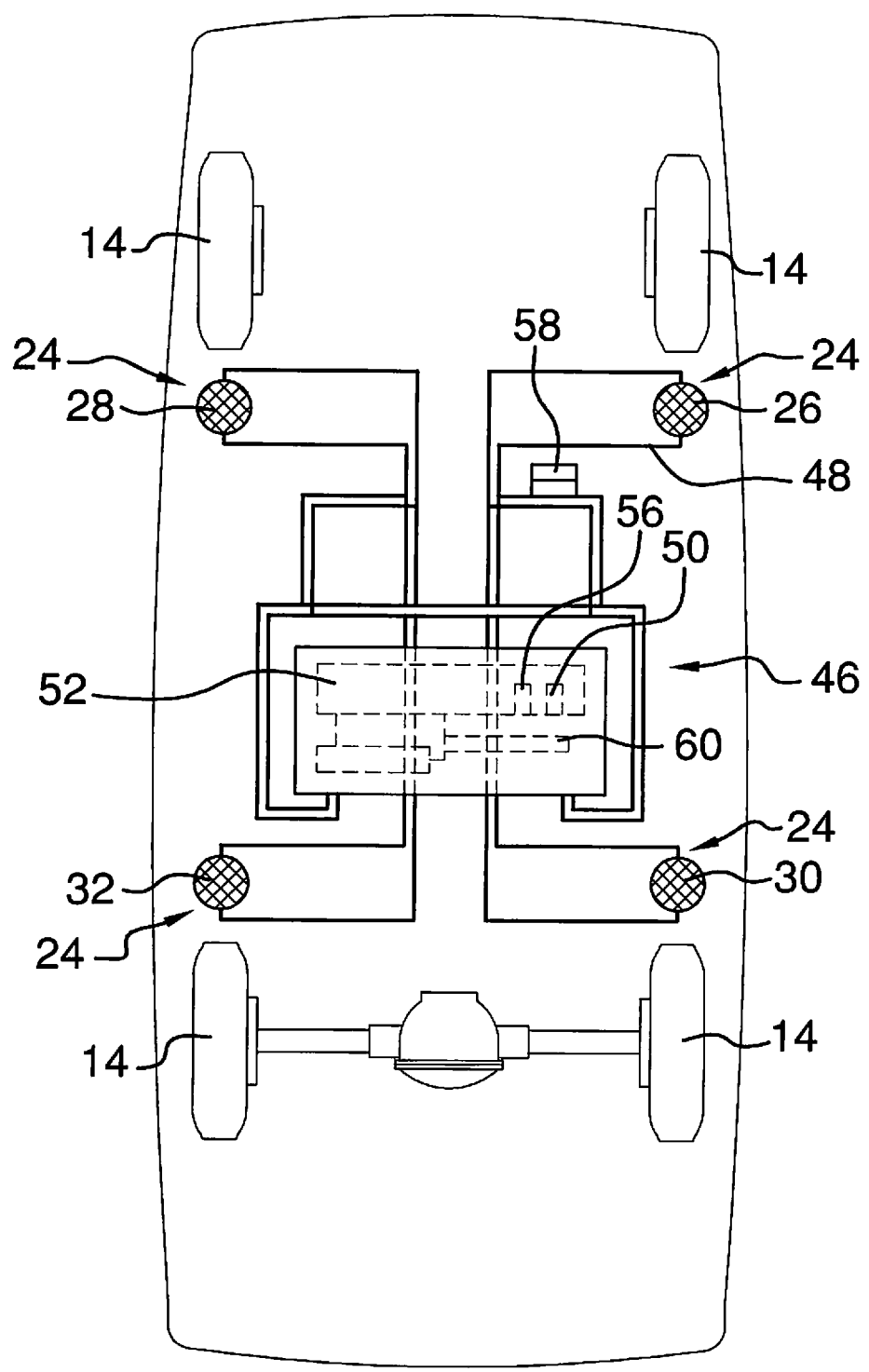
FIG. 2 is a bottom schematic view of an embodiment of the disclosure.
Figure 3:
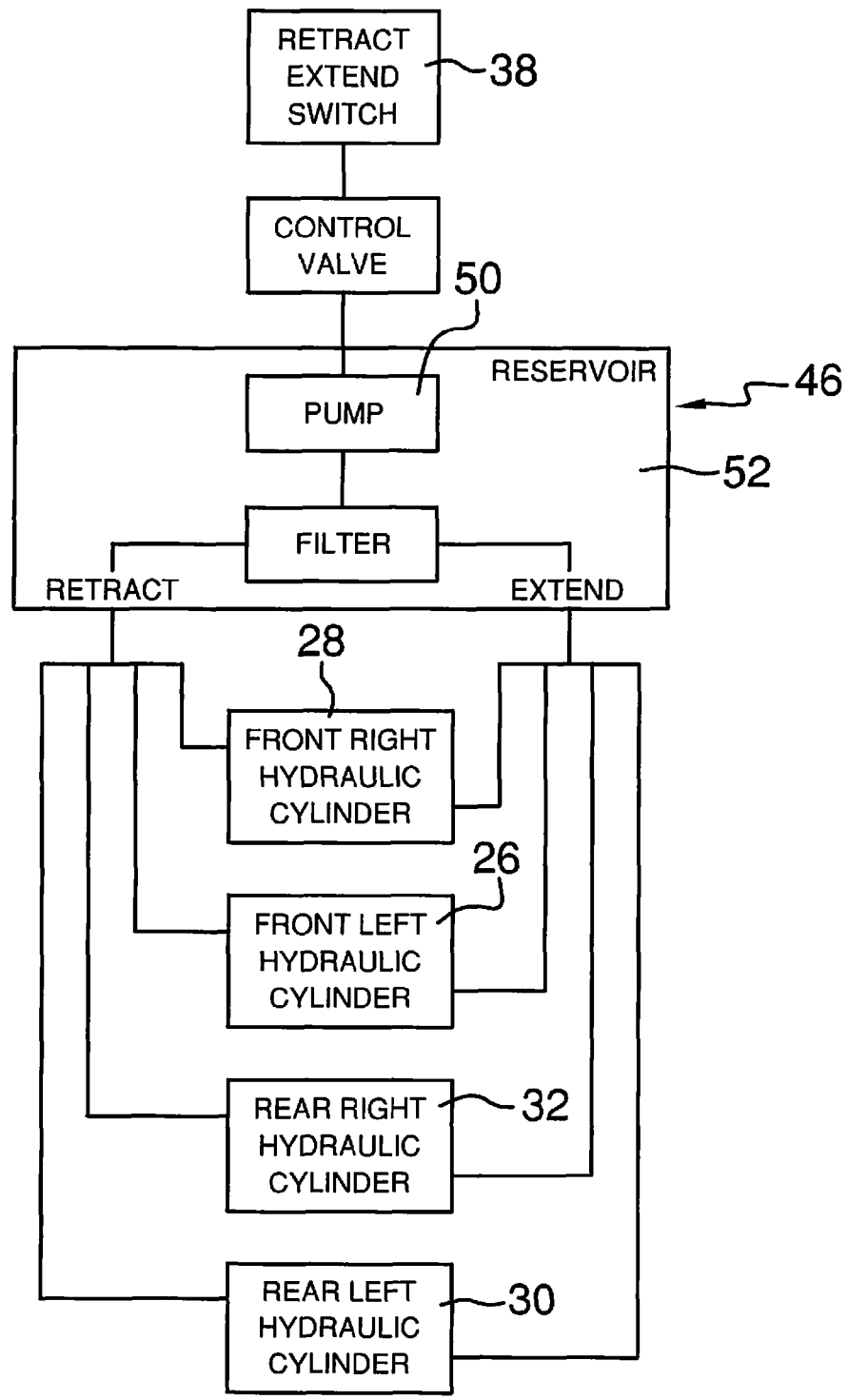
FIG. 3 is a schematic view of an embodiment of the disclosure.
Figure 4:
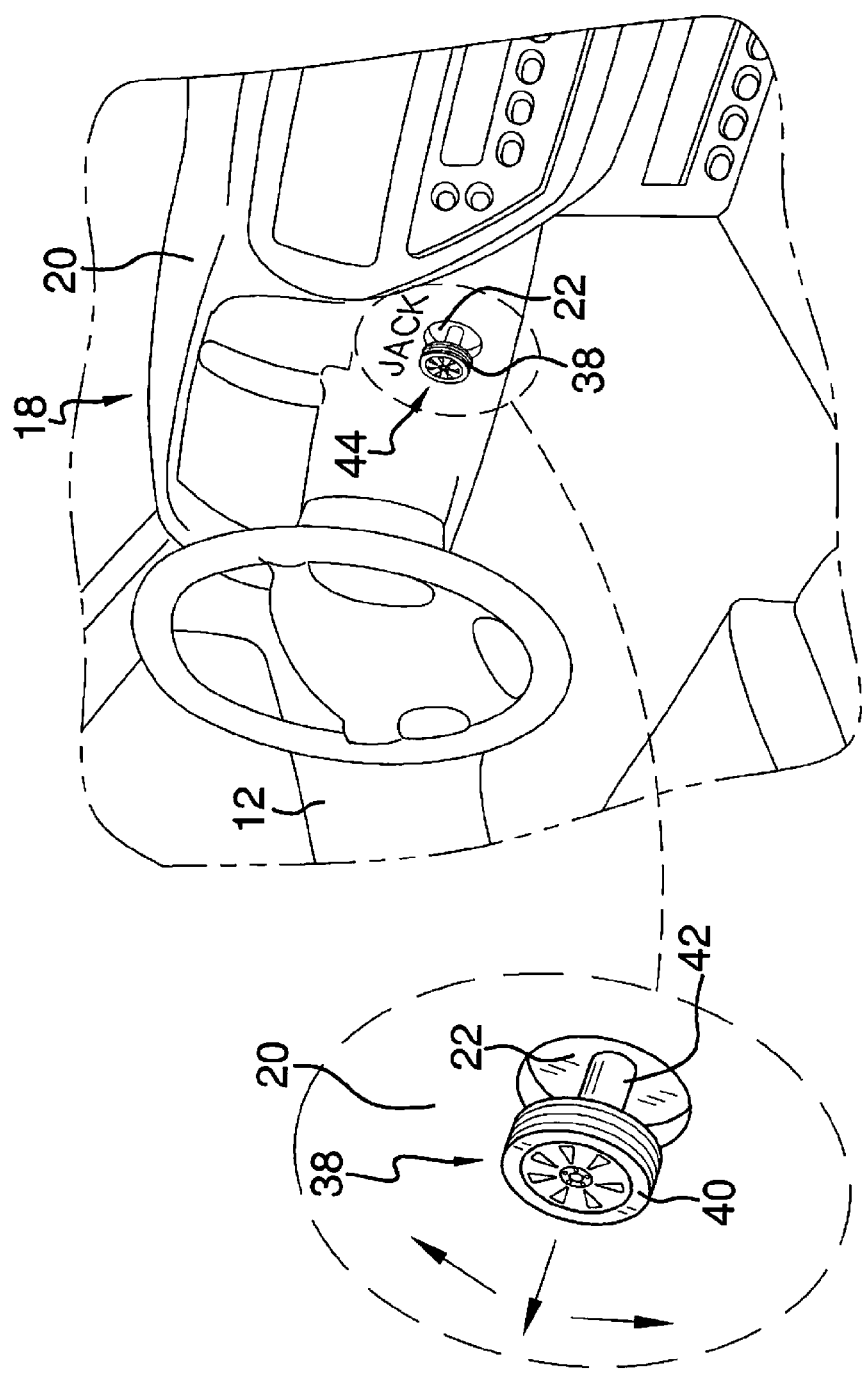
FIG. 4 is a detailed top front side perspective view of an embodiment of the disclosure.

With reference now to the drawings, and in particular to FIGS. 1 through 4 thereof, a new vehicle jack device embodying the principles and concepts of an embodiment of the disclosure and generally designated by the reference numeral 10 will be described.

As best illustrated in FIGS. 1 through 4, the integral vehicle jack assembly 10 generally comprises a vehicle 12 having a plurality of ground engaging members 14. The ground engaging members 14 may be wheels, tires, runners, tracks, or similar device that normally supports the vehicle 12 on a support surface 16. The vehicle 12 has an interior 18 and a dashboard 20 positioned in the interior 18 of the vehicle 12. A recess 22 extends into the dashboard 20 of the vehicle 12 typically proximate a driver's seating area in the interior 18 of the vehicle 12.

A plurality of telescopic supports 24 is coupled to the vehicle 12. Each support 24 may be a single piece extendable from the vehicle 12 or a plurality of nested segments. Typically, four supports 24 are provided including a left and right forward pair 26,28 and a left and right rearward pair 30,32. The supports 24 are each movable between an deployed position 34 and a retracted position 36. The deployed position 34 is configured for raising the vehicle 12 whereby the ground engaging members 14 are positioned in spaced relationship to the support surface 16.

A control 38 is operationally coupled to the supports 24. The control 38 selectively extends and retracts the supports 24. The control 38 is positioned in the interior 18 of the vehicle 12. More specifically, the control 38 has a head portion 40 positioned in the recess 22 and a post portion 42 coupled to and extending from the head portion 40. The post portion 42 is coupled to and extends into the dashboard 20. The post portion 42 may extend from the dashboard 20 whereby the head portion 40 is extendable from the recess 22. The control 38 is operationally coupled to the supports 24 whereby the control 38 is activated to control the supports 24 when the control 38 is in an extended position 44. The head portion 40 is operationally coupled to the supports 24 whereby twisting the head portion 40 in a first direction, such as clockwise, extends the supports 24 and twisting the head portion 40 in a second direction, such as counterclockwise, retracts the supports 24. The head portion 40 is operationally coupled to the supports 24 such that the control 38 is deactivated from moving the supports 24 when the head portion 40 is positioned in the recess 22. Thus, inadvertent manipulation of the control 38 is prevented.

The control 38 is operationally coupled to the supports 24 by a conventional hydraulic system 46 coupled to the vehicle 12. The hydraulic system 46 is operationally coupled to the control 38 and the supports 24 whereby the hydraulic system 46 extends and retracts the supports 24 upon manipulation of the control 38. The hydraulic system 46 includes a hydraulic line 48 coupled to each of the supports 24 and a hydraulic pump 50 coupled to the hydraulic line 48 to provide pressure within the hydraulic line 48. The hydraulic pump 50 is operationally coupled to and controlled by the control 38. The hydraulic pump 50 may be reversible such that the supports 24 are both extendable and retractable by operation of the hydraulic pump 50. The hydraulic system 46 may have a reservoir 52 coupled to the hydraulic line 48 whereby the hydraulic system 46 is a conventional open hydraulic system. The hydraulic system 46 may have a system relief valve 56 operationally coupled to the hydraulic line 48 and a pressure regulator 58 operationally coupled to the hydraulic line 48 and the hydraulic pump 50. A check valve 60 may insure that the supports 24 are held in the deployed position 34 until intentionally moved into the retracted position 36.

In use, whenever a tire needs to be checked or changed, the control 38 is moved into the extended position 44 where it becomes activated to control the hydraulic system 46. The head portion 40 is twisted in the appropriate direction to extend the supports 24 into the deployed position 34 wherein the ground engaging members 14 are lifted off of the support surface 26 with the rest of the vehicle 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. An integral vehicle jack assembly comprising:
a vehicle having a plurality of ground engaging members;
a plurality of telescopic supports coupled to said vehicle, said supports being movable between a deployed position and a retracted position, said deployed position being configured for raising said vehicle whereby said ground engaging members are positioned in spaced relationship to a support surface; and
a control operationally coupled to said supports, said control selectively extending and retracting said supports;
said control being positioned in an interior of said vehicle;
said vehicle including a dashboard in said interior of said vehicle;
a recess extending into said dashboard of said vehicle; and
said control having a head portion, said head portion being positioned in said recess;
said head portion being extendable from said recess, said control being operationally coupled to said supports whereby said control is activated to control said supports when said control is in an extended position;
said head portion being operationally coupled to said supports whereby said control is deactivated from moving said supports when said head portion is positioned in said recess.

2. The assembly of claim 1, further including said control having a post portion coupled to and extending from said head portion, said post portion being coupled to and extending into said dashboard.

3. The assembly of claim 2, further including said post portion extending into said dashboard.

4. The assembly of claim 1, further including said head portion being operationally coupled to said supports whereby twisting said head portion in a first direction extends said supports and twisting said head portion in a second direction retracts said supports.

5. The assembly of claim 1, further including a hydraulic system coupled to said vehicle, said hydraulic system being operationally coupled to said control and said supports whereby said hydraulic system extends and retracts said supports upon manipulation of said control.

6. The assembly of claim 5, further including said hydraulic system including a hydraulic line coupled to each of said supports and a hydraulic pump coupled to said hydraulic line.

7. The assembly of claim 6, further including said hydraulic pump being operationally coupled to said control and said hydraulic pump being reversible whereby said supports are extendable and retractable by operation of said hydraulic pump.

8. The assembly of claim 6, further including a reservoir coupled to said hydraulic line whereby said hydraulic system is an open system.

9. The assembly of claim 6, further including said hydraulic system having a system relief valve operationally coupled to said hydraulic line.

10. The assembly of claim 6, further including said hydraulic system having a pressure regulator operationally coupled to said hydraulic line and said hydraulic pump.

11. An integral vehicle jack assembly comprising:
a vehicle having a plurality of ground engaging members, said vehicle having an interior and a dashboard positioned in said interior of said vehicle;
a recess extending into said dashboard of said vehicle;
a plurality of telescopic supports coupled to said vehicle, said supports being movable between an deployed position and a retracted position, said deployed position being configured for raising said vehicle whereby said ground engaging members are positioned in spaced relationship to a support surface;
a control operationally coupled to said supports, said control selectively extending and retracting said supports, said control being positioned in said interior of said vehicle, said control having a head portion, said head portion being positioned in said recess, said control having a post portion coupled to and extending from said head portion, said post portion being coupled to and extending into said dashboard, said post portion extending into said dashboard, said head portion being extendable from said recess, said control being operationally coupled to said supports whereby said control is activated to control said supports when said control is in an extended position, said head portion being operationally coupled to said supports whereby twisting said head portion in a first direction extends said supports and twisting said head portion in a second direction retracts said supports, said head portion being operationally coupled to said supports whereby said control is deactivated from moving said supports when said head portion is positioned in said recess; and
a hydraulic system coupled to said vehicle, said hydraulic system being operationally coupled to said control and said supports whereby said hydraulic system extends and retracts said supports upon manipulation of said control, said hydraulic system including a hydraulic line coupled to each of said supports and a hydraulic pump coupled to said hydraulic line, said hydraulic pump being operationally coupled to said control and said hydraulic pump being reversible whereby said supports are extendable and retractable by operation of said hydraulic pump, said hydraulic system having a reservoir coupled to said hydraulic line whereby said hydraulic system is an open system, said hydraulic system having a system relief valve operationally coupled to said hydraulic line, said hydraulic system having a pressure regulator operationally coupled to said hydraulic line and said hydraulic pump.

\* \* \* \* \*